US012693654B2

(12) United States Patent
Wells et al.

(10) Patent No.: US 12,693,654 B2
(45) Date of Patent: Jul. 28, 2026

(54) SYSTEMS, METHODS, AND COMPUTER PROGRAM PRODUCTS FOR HIERARCHICAL MULTI-AGENT GOAL-SEEKING

(71) Applicant: Sanctuary Cognitive Systems Corporation, Vancouver (CA)

(72) Inventors: James Gordon Wells, North Vancouver (CA); Geordie Rose, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 108 days.

(21) Appl. No.: 18/444,640

(22) Filed: Feb. 17, 2024

(65) Prior Publication Data

US 2024/0280967 A1     Aug. 22, 2024

Related U.S. Application Data

(60) Provisional application No. 63/446,702, filed on Feb. 17, 2023.

(51) Int. Cl.
| | |
|---|---|
| *G05B 19/4155* | (2006.01) |
| *B25J 9/16* | (2006.01) |
| *G05B 13/02* | (2006.01) |

(52) U.S. Cl.
CPC .......... *G05B 19/4155* (2013.01); *B25J 9/163* (2013.01); *G05B 13/0265* (2013.01); *G05B 2219/50391* (2013.01)

(58) Field of Classification Search
CPC ............ G05B 19/4155; G05B 13/0265; G05B 2219/50391; B25J 9/163

USPC ................. 700/245–264; 318/568.11–568.25
See application file for complete search history.

(56) References Cited

U.S. PATENT DOCUMENTS

| | | | | |
|---|---|---|---|---|
| 9,050,723 | B1 * | 6/2015 | Elazary .................... | B25J 9/163 |
| 10,168,674 | B1 * | 1/2019 | Buerger ............... | G05D 1/0088 |
| 11,345,040 | B2 * | 5/2022 | Oleynik ............. | G05B 19/4183 |
| 11,443,380 | B2 * | 9/2022 | Cummings ........... | G06Q 40/04 |
| 11,772,272 | B2 * | 10/2023 | Khansari Zadeh ...... | B25J 9/161 |
| | | | | 700/259 |
| 2005/0242919 | A1 * | 11/2005 | Wang ..................... | A61B 17/00 |
| | | | | 606/1 |

(Continued)

*Primary Examiner* — Jaime Figueroa
(74) *Attorney, Agent, or Firm* — Thomas Mahon

(57)     ABSTRACT

Systems, methods, and computer program products for autonomous, multi-agent goal-seeking are described. In an exemplary implementation, a hierarchical operational structure of a business employs autonomous AI-based controllers and robot systems in a bidirectional communication network to leverage fast and complete data sharing across all levels of the business. The comprehensive data collection is used to support the formulation of, and measure progress against, a hierarchical goal structure in which the top-level business controller specifies top-level business objectives and successive lower-level tiers of the business control hierarchy execute tasks and specify successively lower-level objectives for the tiers below. The ground level of the hierarchy comprises autonomous robot workers that autonomously perform ground-level tasks and data collection to support the business, and deliver reports back upstream to inform the higher-level objective setting.

18 Claims, 8 Drawing Sheets

(56)     References Cited

U.S. PATENT DOCUMENTS

| | | | |
|---|---|---|---|
| 2011/0029128 A1* | 2/2011 | Serre .................. | G05B 19/4141 |
| | | | 700/245 |
| 2011/0066282 A1* | 3/2011 | Bosscher .............. | B25J 9/1676 |
| | | | 700/255 |
| 2013/0054023 A1* | 2/2013 | Bruemmer ............. | B25J 9/1633 |
| | | | 700/245 |
| 2013/0080360 A1* | 3/2013 | Sterritt .................. | G05B 13/02 |
| | | | 706/14 |
| 2015/0207866 A1* | 7/2015 | Fujie .................... | G06F 11/323 |
| | | | 709/204 |
| 2016/0008985 A1* | 1/2016 | Kim ......................... | G06F 1/18 |
| | | | 901/1 |
| 2016/0243701 A1* | 8/2016 | Gildert .................. | G05B 19/42 |
| 2019/0291277 A1* | 9/2019 | Oleynik ................ | B25J 9/1669 |
| 2021/0264520 A1* | 8/2021 | Cummings ............. | G06Q 40/04 |
| 2022/0197306 A1* | 6/2022 | Cella ...................... | G06N 20/10 |
| 2023/0098602 A1* | 3/2023 | Cella ..................... | B25J 9/1674 |
| | | | 700/248 |
| 2023/0109398 A1* | 4/2023 | Kranski ................ | B25J 9/1615 |
| | | | 700/250 |
| 2023/0278223 A1* | 9/2023 | Gildert .................. | B25J 9/1694 |
| | | | 700/250 |
| 2024/0069501 A1* | 2/2024 | Cherian ............... | G05B 13/027 |
| 2024/0264604 A1* | 8/2024 | Kugou .................. | G05D 1/667 |

* cited by examiner

300

Region Manager 210

Region Manager 220

Region Manager 230

Global Manager 310

500

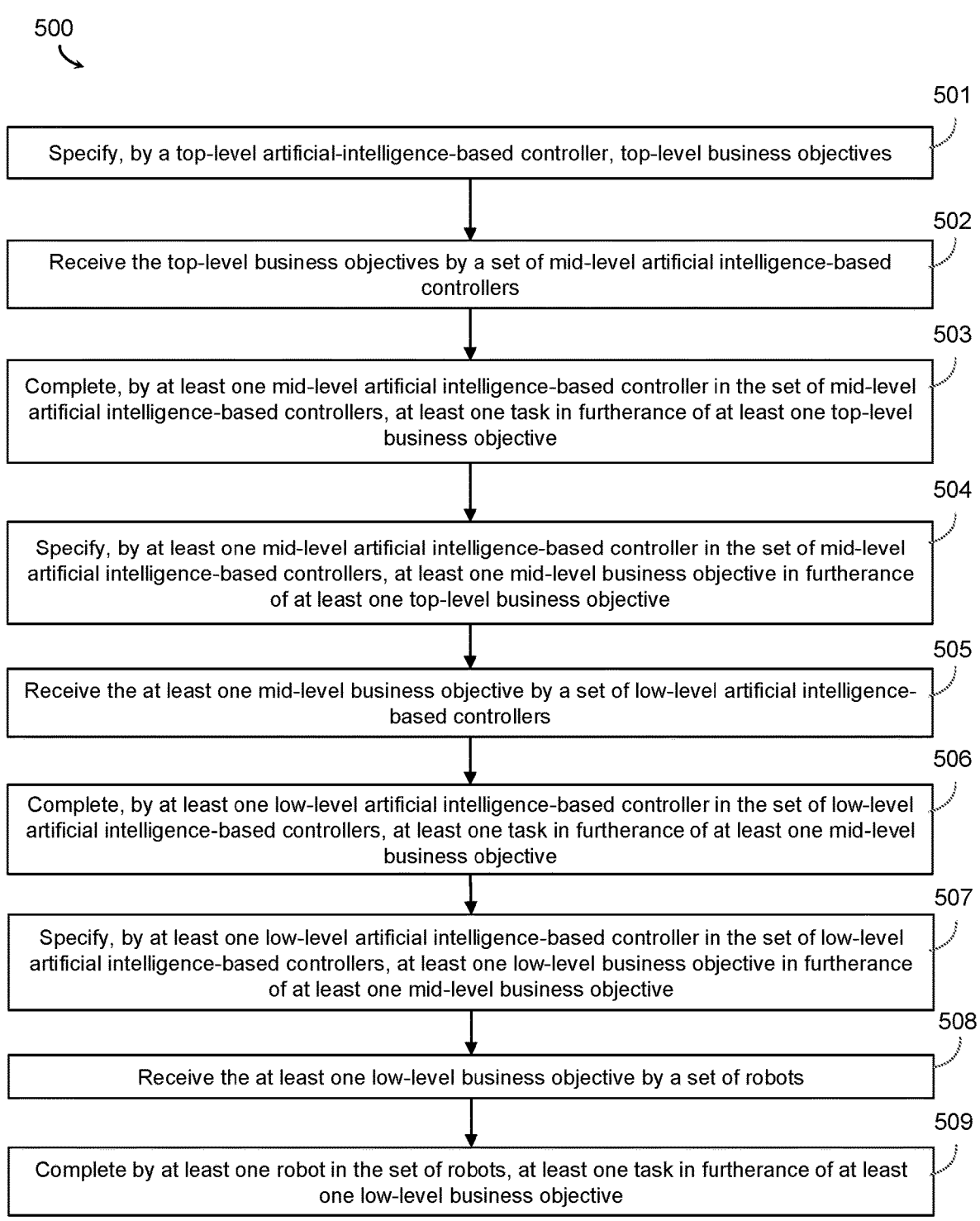

501

Specify, by a top-level artificial-intelligence-based controller, top-level business objectives

502

Receive the top-level business objectives by a set of mid-level artificial intelligence-based controllers

503

Complete, by at least one mid-level artificial intelligence-based controller in the set of mid-level artificial intelligence-based controllers, at least one task in furtherance of at least one top-level business objective

504

Specify, by at least one mid-level artificial intelligence-based controller in the set of mid-level artificial intelligence-based controllers, at least one mid-level business objective in furtherance of at least one top-level business objective

505

Receive the at least one mid-level business objective by a set of low-level artificial intelligence-based controllers

506

Complete, by at least one low-level artificial intelligence-based controller in the set of low-level artificial intelligence-based controllers, at least one task in furtherance of at least one mid-level business objective

507

Specify, by at least one low-level artificial intelligence-based controller in the set of low-level artificial intelligence-based controllers, at least one low-level business objective in furtherance of at least one mid-level business objective

508

Receive the at least one low-level business objective by a set of robots

509

Complete by at least one robot in the set of robots, at least one task in furtherance of at least one low-level business objective

601

Collect, by at least one robot system in a set of robot systems, data about completing at least one task in furtherance of at least one low-level objective

602

Receive, by a low-level artificial intelligence-based controller in a set of low-level artificial intelligence-based controllers, the data

603

Generate, by the low-level artificial intelligence-based controller in the set of low-level artificial intelligence-based controllers, at least a first report based at least in part on the data

604

Receive, by a mid-level artificial intelligence-based controller in a set of low-level artificial intelligence-based controllers, the first report

605

Generate, by the mid-level artificial intelligence-based controller in the set of mid-level artificial intelligence-based controllers, at least a second report based at least in part on the first report

606

Receive, by a top-level artificial intelligence-based controller, the second report

607

Specify, by the top-level artificial intelligence controller, at least one top-level objective based at least in part on the second report

Top-Level AI Controller   801

Mid-Level AI Controllers   802

Low-Level AI Controllers   803

SYSTEMS, METHODS, AND COMPUTER PROGRAM PRODUCTS FOR HIERARCHICAL MULTI-AGENT GOAL-SEEKING

TECHNICAL FIELD

The present systems, methods, and computer program products generally relate to collective multi-agent goal-seeking and particularly relate to the autonomous operation of multi-level or hierarchical systems employing artificial intelligence-based controllers and robot systems.

BACKGROUND

Description of the Related Art

Robots are machines that may be deployed to perform tasks. Robots may come in a variety of different form factors, including humanoid form factors. Humanoid robots may be operated by tele-operation systems through which the robot is caused to emulate the physical actions of a human operator or pilot. Special-purpose robots may be designed to perform a specific task, whereas general purpose robots may be designed to perform a multitude of tasks.

Humans perform many tasks in their personal and work lives. Examples of tasks include everything from making a bed, to washing dishes, to loading a dishwasher, to mowing a lawn, to taking inventory, to checking out customers, to stocking shelves, to painting, to hairstyling, to preparing a meal, to cleaning, to taking measurements, to performing calculations, to recording data, to performing analyses, to creating art/music, to performing art/music, to building, to manufacturing, to assembling, to destroying, to disassembling, to displacing, to pick-and-placing, to navigating, and on and on. In many cases, there is a strong desire, and an ongoing need, to automate various tasks so that humans may direct their time and/or attention to other things.

BRIEF SUMMARY

A method of operating a hierarchical control system may be summarized as including: specifying, by a top-level artificial-intelligence-based controller, at least one top-level objective; receiving the at least one top-level objective by a set of mid-level artificial intelligence-based controllers; specifying, by at least one mid-level artificial intelligence-based controller in the set of mid-level artificial intelligence-based controllers, at least one mid-level objective in furtherance of at least one top-level objective; receiving the at least one mid-level objective by a set of low-level artificial intelligence-based controllers; specifying, by at least one low-level artificial intelligence-based controller in the set of low-level artificial intelligence-based controllers, at least one low-level objective in furtherance of at least one mid-level objective; receiving the at least one low-level objective by a set of robot systems; completing, by at least one robot system in the set of robot system, at least one task in furtherance of at least one low-level objective. The method may further include completing, by at least one mid-level artificial intelligence-based controller in the set of mid-level artificial intelligence-based controllers, at least one task in furtherance of at least one top-level objective. The method may further include completing, by at least one low-level artificial intelligence-based controller in the set of low-level artificial intelligence-based controllers, at least one task in furtherance of at least one mid-level business objective.

The hierarchical control system may include a multi-level business operation. Specifying, by a top-level artificial intelligence-based controller, at least one top-level objective may include specifying, by a top-level artificial-intelligence-based controller, at least one top-level business objective. Receiving the at least one top-level objective by a set of mid-level artificial intelligence-based controllers may include receiving the at least one top-level business objective by a set of mid-level artificial intelligence-based controllers. Specifying, by at least one mid-level artificial intelligence-based controller in the set of mid-level artificial intelligence-based controllers, at least one mid-level objective in furtherance of at least one top-level objective may include specifying, by at least one mid-level artificial intelligence-based controller in the set of mid-level artificial intelligence-based controllers, at least one mid-level business objective in furtherance of at least one top-level business objective. Receiving the at least one mid-level objective by a set of low-level artificial intelligence-based controllers may include receiving the at least one mid-level business objective by a set of low-level artificial intelligence-based controllers. Specifying, by at least one low-level artificial intelligence-based controller in the set of low-level artificial intelligence-based controllers, at least one low-level objective in furtherance of at least one mid-level objective may include specifying, by at least one low-level artificial intelligence-based controller in the set of low-level artificial intelligence-based controllers, at least one low-level business objective in furtherance of at least one mid-level business objective. Receiving the at least one low-level objective by a set of robot systems may include receiving the at least one low-level business objective by a set of robot systems. Completing, by at least one robot system in the set of robot system, at least one task in furtherance of at least one low-level objective may include completing, by at least one robot system in the set of robot system, at least one task in furtherance of at least one low-level business objective. Each low-level artificial intelligence-based controller in the set of low-level artificial intelligence-based controllers may at least partially control operations at a respective business location of the multi-level business operation. Each mid-level artificial intelligence-based controller in the set of mid-level artificial intelligence-based controllers may at least partially control operations over a respective business region of the multi-level business operation, each respective business region consisting of a respective set of business locations. The top-level artificial-intelligence-based controller may at least partially control operations of all business regions in the multi-level business operation.

The method may further include collecting, by at least one robot system in the set of robot systems, data about completing the at least one task in furtherance of at least one low-level objective; receiving, by a low-level artificial intelligence-based controller in the set of low-level artificial intelligence-based controllers, the data; generating, by the low-level artificial intelligence-based controller in the set of low-level artificial intelligence-based controllers, at least a first report based at least in part on the data; receiving, by a mid-level artificial intelligence-based controller in the set of low-level artificial intelligence-based controllers, the first report; generating, by the mid-level artificial intelligence-based controller in the set of mid-level artificial intelligence-based controllers, at least a second report based at least in part on the first report; receiving, by the top-level artificial intelligence-based controller, the second report; and specifying, by the top-level artificial intelligence controller, at least one top-level objective based at least in part on the second report.

A multi-level control system may be summarized as including a top-level artificial-intelligence-based controller to specify top-level objectives; a set of mid-level artificial intelligence-based controllers to specify mid-level objectives in furtherance of the top-level objectives; a set of low-level artificial intelligence-based controllers to specify low-level objectives in furtherance of the mid-level objectives; and a set of robot systems to complete tasks in furtherance of the low-level objectives.

At least one low-level artificial intelligence-based controller may be embodied in a robot system in the set of robot systems. At least one mid-level artificial intelligence-based controller may be embodied in a robot system in the set of robot systems. The top-level artificial intelligence-based controller may be embodied in a robot system in the set of robot systems. Each of the top-level artificial intelligence-based controller, the set of mid-level artificial intelligence-based controllers, the set of low-level artificial intelligence-based controllers, and the set of robot systems may all operate substantially without human intervention.

Each low-level artificial intelligence-based controller in the set of low-level artificial intelligence-based controllers may at least partially control operations of a respective set of robot systems at a respective business location. Each mid-level artificial intelligence-based controller in the set of mid-level artificial intelligence-based controllers may at least partially control operations of a respective subset of low-level artificial intelligence-based controllers in the set of low-level artificial intelligence-based controllers. The top-level artificial intelligence-based controller may at least partially control operations of each mid-level artificial intelligence-based controller in the set of mid-level artificial intelligence-based controllers.

The top-level artificial-intelligence-based controller may comprise a non-transitory processor-readable storage medium storing processor-executable instructions and/or data that, when executed by at least one processor, cause the at least one processor to specify top-level objectives. Each mid-level artificial intelligence-based controller in the set of mid-level artificial intelligence-based controllers may comprise respective processor-executable instructions and/or data that, when executed by at least one processor, cause the at least one processor to specify mid-level objectives in furtherance of the top-level objectives. Each low-level artificial intelligence-based controller in the set of low-level artificial intelligence-based controllers may comprise respective processor-executable instructions and/or data that, when executed by at least one processor, cause the at least one processor to specify low-level objectives in furtherance of the mid-level objectives. The top-level artificial intelligence-based controller, the set of mid-level artificial intelligence-based controllers, and the set of low-level artificial intelligence-based controllers may all be stored on a same non-transitory processor-readable storage medium. At least two of the top-level artificial intelligence-based controller, a mid-level artificial intelligence-based controller in the set of mid-level artificial intelligence-based controllers, and a low-level artificial intelligence-based controller in the set of low-level artificial intelligence-based controllers may be stored on separate respective non-transitory processor-readable storage media.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

FIG. 5 is a flow diagram showing an exemplary method of collective multi-agent goal-seeking (e.g., autonomous operation of a multi-level business) in accordance with the present systems, methods, and computer program products.

FIG. 6 is a flow diagram showing an exemplary method of operating a multi-level control system (e.g., a business) in accordance with the present systems, methods, and computer program products.

DETAILED DESCRIPTION

Figure 1:
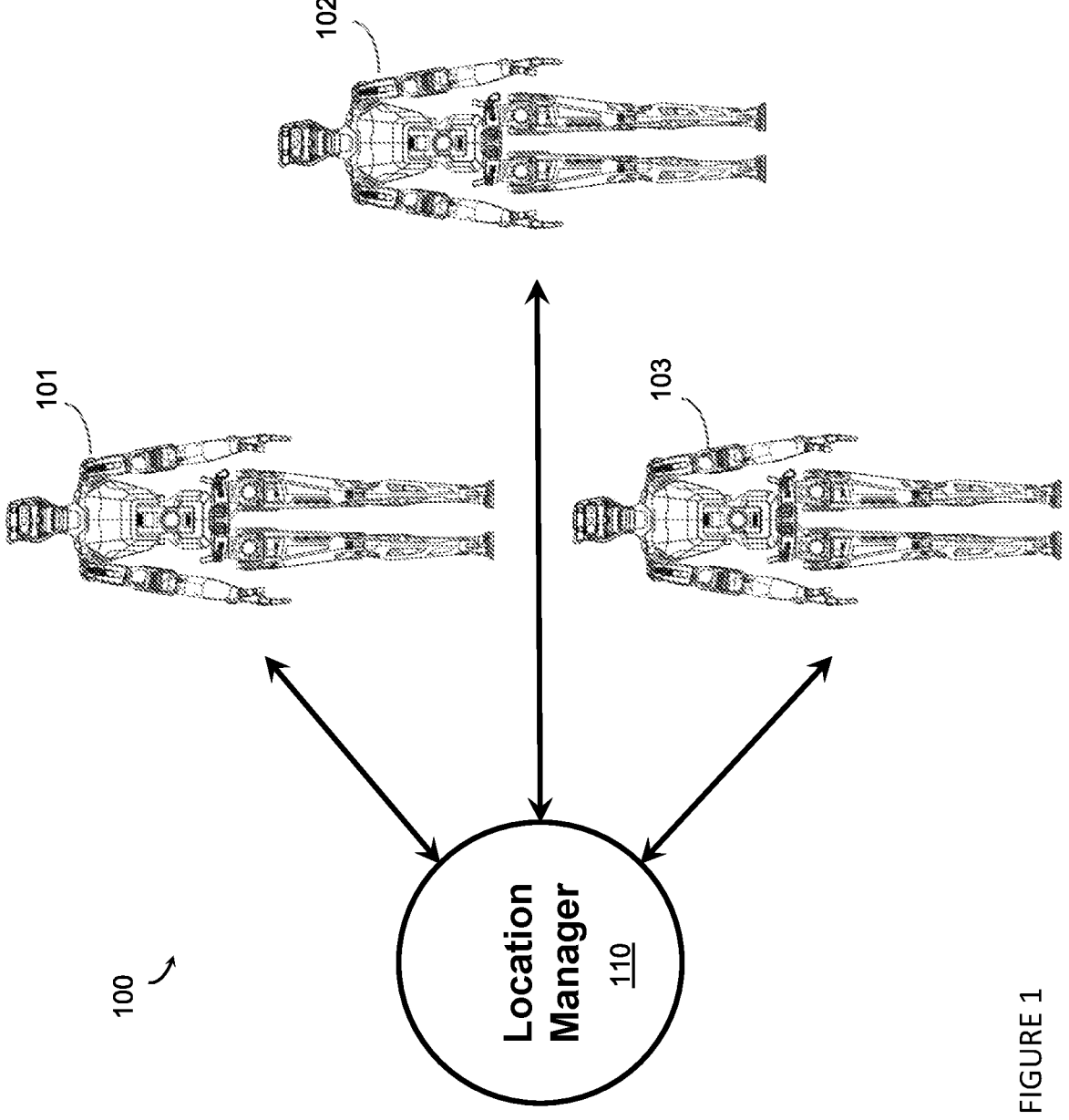
FIG. 1 is an illustrative diagram of a low-level tier of a multi-level business in accordance with the present systems, methods, and computer program products.

The following description sets forth specific details in order to illustrate and provide an understanding of the various implementations and embodiments of the present systems, methods, and computer program products. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment"

include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, methods, and computer program products.

The various implementations described herein provide systems, methods, and computer program products that employ collective multi-agent goal-seeking to achieve sophisticated, multi-level objectives. A particular example of the present systems, methods, and computer program products achieves autonomous operation of a multi-level business by employing a hierarchical configuration of artificial intelligence-based controllers and robot systems. By automating the execution, planning, and goal-setting at each level of a multi-level business, a completely autonomous business operation is realized.

Exemplary robot systems that may employ the teachings of the present systems, methods, and computer program products include, without limitation, the general-purpose humanoid robots developed by Sanctuary Cognitive Systems Corporation, various aspects of which are described in U.S. Provisional Patent Application Ser. No. 63/446,702, filed Feb. 17, 2023; U.S. patent application Ser. No. 18/425,527, U.S. patent application Ser. No. 18/425,557, U.S. patent application Ser. No. 18/425,253, U.S. patent application Ser. No. 18/375,943, U.S. patent application Ser. No. 18/513,440, U.S. patent application Ser. No. 18/417,081, U.S. patent application Ser. No. 18/424,551, U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), US Patent Publication No. US 2021-0307170 A1, and/or U.S. patent application Ser. No. 17/386,877, as well as U.S. Provisional Patent Application Ser. No. 63/151,044, U.S. patent application Ser. No. 17/719,110, U.S. patent application Ser. No. 17/737,072, U.S. patent application Ser. No. 17/846,243, U.S. patent application Ser. No. 17/566,589, U.S. patent application Ser. No. 17/962,365, U.S. patent application Ser. No. 18/089,155, U.S. patent application Ser. No. 18/089,517, U.S. patent application Ser. No. 17/985,215, U.S. patent application Ser. No. 17/883,737, U.S. Provisional Patent Application Ser. No. 63/441,897, and/or U.S. patent application Ser. No. 18/117,205, each of which is incorporated herein by reference in its entirety.

In some implementations, a robot control system may employ a finite Instruction Set comprising generalized reusable work primitives that can be combined (in various combinations and/or permutations) to execute a task. For example, a robot control system may store a library of reusable work primitives each corresponding to a respective basic sub-task or sub-action that the robot is operative to autonomously perform (hereafter referred to as an Instruction Set). A work objective may be analyzed to determine a sequence (i.e., a combination and/or permutation) of reusable work primitives that, when executed by the robot, will complete the work objective. The robot may execute the sequence of reusable work primitives to complete the work objective. In this way, a finite Instruction Set may be used to execute a wide range of different types of tasks and work objectives across a wide range of industries. This approach is described in US Patent Publication No. 2022-0258340 based on U.S. patent application Ser. No. 17/566,589, which is incorporated herein by reference in its entirety.

Herein, a "multi-level" objective generally refers to an objective that may be characterized as an objective having a hierarchy of dependent aspects, and a "multi-level" business generally refers to a business enterprise that implements a hierarchy of operation and control levels. For example, a business that comprises multiple brick-and-mortar retail location storefronts may include regional control centers that each manage the operations of the location storefronts in a respective region, and a corporate headquarters that manages the operations of the regional control centers. Conventionally, the physical storefronts deploy low-level workers "on the ground" that perform customer tasks that are core to the business. Each physical storefront may also employ a store manager that controls the operations of the workers on the ground. A regional control center may employ systems and people to manage the operations of the individual storefronts in a corresponding region, and the corporate headquarters may employ systems and people to manage the operations of the regional control centers. Those of skill in the art will appreciate that this hierarchical configuration is exemplary only and different business and/or operational models may employ a different chain of command and/or hierarchical configuration of operational control.

In accordance with the present systems, methods, and computer program products, all of the functions and operations of a multi-level system (such as but not limited to a multi-level business) may be performed autonomously by a hierarchy of artificial intelligence-based controllers and robots. Herein, the term "artificial intelligence-based controller" is used to refer to a processing system that employs artificial intelligence (AI) to analyze data and control the operations of various systems, e.g., including itself, other artificial intelligence-based controllers, and/or robot systems. Depending on the specific implementation, an artificial intelligence-based controller may be or include a robot system, or may be executed by the computational hardware of a robot system, or may be executed by more conventional computer hardware that is not a robot system (such as one or more servers or desktop computers with associated data and computer program products, either situated locally or accessed remotely through the cloud). Examples of AI algorithms/techniques that may be implemented by an AI-based controller include, without limitation: neural networks, large behavior models, policies/models trained through reinforcement learning (including offline and/or online reinforcement learning), and/or policies/models trained through behavior cloning.

An advantage to the autonomous business framework described herein includes complete bi-directional access to information across all entities in the hierarchical network. That is, in the autonomous business frameworks described herein, the controller at the corporate headquarters (e.g., typically the human CEO, though in this case the top-level artificial intelligence-based controller) has immediate and complete access to all of the data collected by all of the lowest-level workers on the ground in the physical store-fronts across the entire business; and similarly, each of the lowest-level workers on the ground has immediate and complete access to all of the data processed by the top-level AI-based controller and the results of such top-level data processing. Since the individual workers are autonomous robot systems in the present systems, methods, and com-puter program products, everything they see and hear, every-thing they measure, every interaction they have—essentially all data that they process—may be stored and accessed by the top-level controller as needed, and by each other (i.e., "laterally") as needed. Likewise, all data available to the top-level controller may be relayed downstream to any and all individual worker robots. This complete, immediate, and bi-directional flow of data may be leveraged by an autono-mous multi-level business to optimize operations far beyond that which is attainable by a conventional business model operating with incomplete information sharing across many humans in the loop.

FIG. 1 is an illustrative diagram of a low-level tier of a multi-level business 100 in accordance with the present systems, methods, and computer program products. FIG. 1 may represent a single brick and mortar storefront location at which a single location manager 110 controls the opera-tion of a single fleet of robot workers 101, 102, and 103. The robot workers 101 102, and 103 may include general pur-pose humanoid robots, multi-purpose robots, and/or various special-purpose robots. The location manager 110 may com-prise an artificial intelligence-based controller that may be embodied in a humanoid robot or may simply be executed as a computer program product by any number of computer systems and/or servers located either locally at the same location as the fleet of robot workers 101, 102, and 103, or located remote from the location but in communication with the fleet of robot workers 101, 102, and 103. The bidirec-tional arrows in FIG. 1 represent the flow of information between robot workers 101, 102, 103 and the location manager 110. For example, there is complete and immediate flow of information from all robot workers 101, 102, and 103 to the location manager 110 and from the location manager 110 to all robot workers 101, 102, and 103. In this scheme, information from a first robot worker 101 may flow to a second robot worker 102 through the location manager 110 as needed (e.g., learning business information, like that a particular item is out of stock, and/or learning functional information, like how best to grasp a particular object, and/or learning operational information, like to be mindful of the spill in aisle 6).

Figure 2:
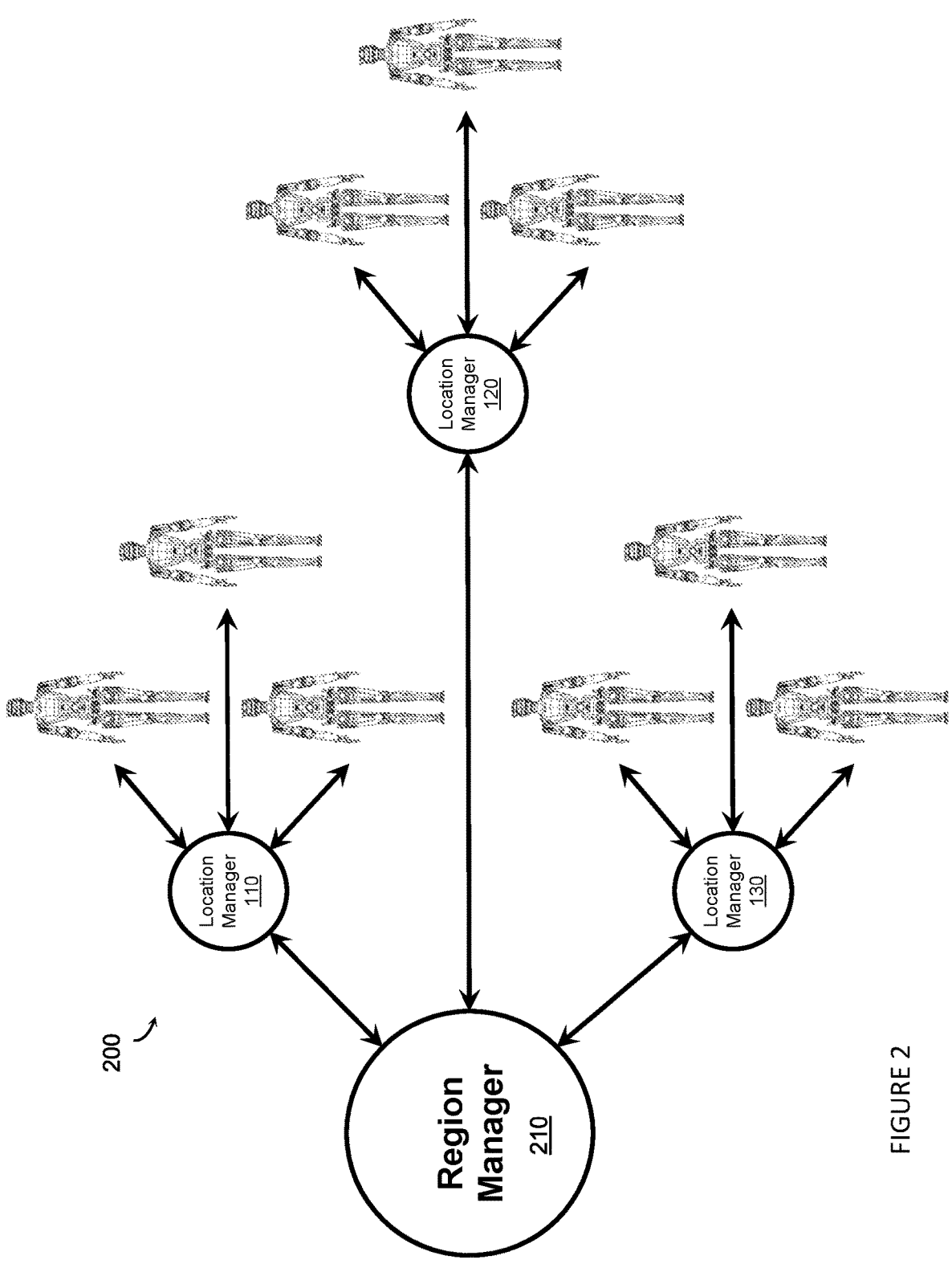
FIG. 2 is an illustrative diagram of a mid-level tier of a multi-level business in accordance with the present systems, methods, and computer program products.

FIG. 2 is an illustrative diagram of a mid-level tier of a multi-level business 200 in accordance with the present systems, methods, and computer program products. FIG. 2 may represent a single regional control center, or Region Manager, 210 that controls the operation of multiple loca-tions 110, 120, and 130. E.g., the Region Manager 210 in FIG. 2 may control the operations of three Location Man-agers (Location Manager 110, Location Manager 120, and Location Manager 130), where each Location Manager 110, 120, and 130 corresponds to a respective instance of a brick-and-mortar location such as location manager 110 depicted in FIG. 1. The Region Manager 210 may comprise an artificial intelligence-based controller that may be embodied in a humanoid robot or may simply be executed as a computer program product by any number of computer systems and/or servers located either locally at the same location as the regional control center, or located remote from the region control center in communication with the location managers 110, 120, and 130. The bidirectional arrows in FIG. 2 represent the flow of information between region manager 210 and the location managers 110, 120, and 130 and between the location managers 110, 120, and 130 and the region manager 210. For example, there is complete and immediate flow of information from all location man-agers 110, 120, and 130 to the region manager 210 and from the region manager 210 to all location managers 110, 120, and 130. Since the location managers 110, 120, and 130 also have complete access to all of the information of the robot workers (e.g., 101, 102, and 103, not called out in FIG. 2 to reduce clutter), this scheme also makes available complete bidirectional flow between the region manager 210 and the robot workers (e.g., 101, 102, and 103), mediated via the location managers 110, 120, and 130.

Figure 3:
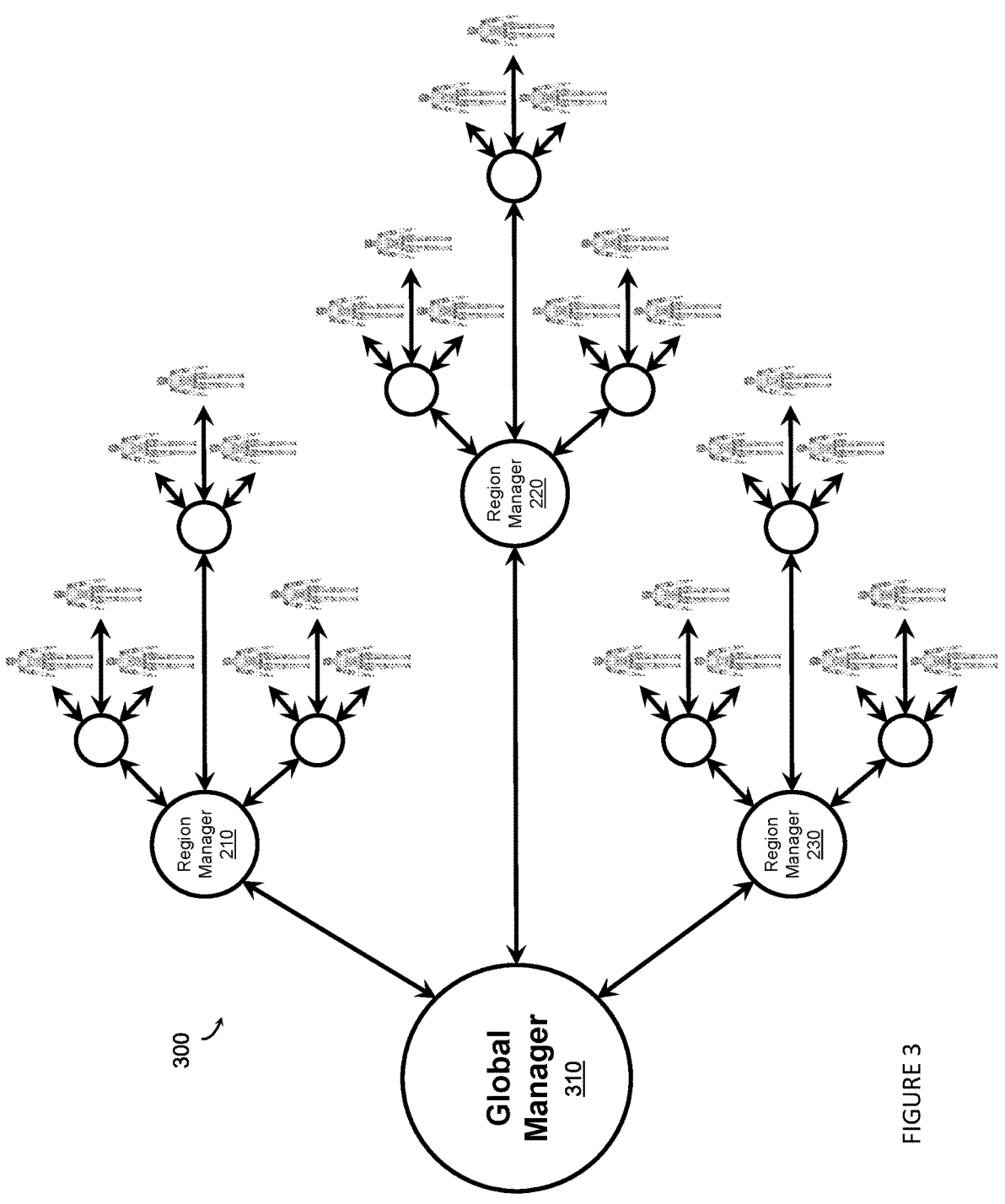
FIG. 3 is an illustrative diagram of a top-level tier of a multi-level business in accordance with the present systems, methods, and computer program products.

FIG. 3 is an illustrative diagram of a top-level tier of a multi-level business 300 in accordance with the present systems, methods, and computer program products. FIG. 3 may represent a single global control center (e.g., corporate headquarters, Global Manager) 310 that controls the opera-tion of multiple regions 210, 220, and 230. E.g., the Global Manager 310 in FIG. 3 may control the operations of three Region Managers (Region Manager 210, Region Manager 220, and Region Manager 230), where each Region Man-ager corresponds to a respective instance of a retail control center such as Region Manager 210 depicted in FIG. 2. The Global Manager 310 may comprise an artificial intelligence-based controller that may be embodied in a humanoid robot or may simply be executed as a computer program product by any number of computer systems and/or servers located either locally at the same location as the corporate head-quarters, or located remote from the corporate headquarters in communication with the region managers 210, 220, and 230. The bidirectional arrows in FIG. 3 represent the flow of information between global manager 310 and the region managers 210, 220, and 230 and between the region man-agers 210, 220, and 230 and the global manager 310. For example, there is complete and immediate flow of informa-tion from all region managers 210, 220, and 230 to the global manager 310 and from the global manager 310 to all region managers 210, 220, and 230. Since the region man-agers 210, 220, and 230 also have complete access to all information of the location managers (e.g., 110, 120, and 130, etc., not called out in FIG. 3 to reduce clutter) which includes all of the information of the robot workers (e.g., 101, 102, and 103, etc., not called out in FIG. 3 to reduce clutter) this scheme also makes available complete bidirec-tional flow between the global manager 310 and the robot workers (e.g., 101, 102, and 103), mediated via the region managers 210, 220, and 230 and the location managers (e.g., 110, 120, and 130).

The bidirectional communication network depicted through FIGS. 1, 2, and 3 enables decisions regarding the operation of the multi-level business to be made quickly and based on complete information. By contrast, a conventional multi-level business that employs humans in the loop at all levels (e.g., on the ground, as the location manager, as the region manager, as the global manager) suffers from inefficiencies that arise due to incomplete information sharing, biased information, and even malicious or self-serving misinformation. Furthermore, a conventional multi-level business that operates with humans in the loop also typically suffers from misunderstandings and/or misinterpretations of objectives and/or instructions—neither of which occur in the autonomous multi-level business operations described herein. In accordance with the present systems, methods, and computer program products, each of the top-level artificial intelligence-based controller, the set of mid-level artificial intelligence-based controllers, the set of low-level artificial intelligence-based controllers, and the set of robot systems may operate substantially without human intervention.

With a hierarchical communication framework (as illustrated by example in FIGS. 1, 2, and 3) thus established, the present systems, methods, and computer program products leverage such a hierarchy to employ collective multi-agent goal-seeking and achieve sophisticated, multi-level objectives, such as for example the efficient autonomous operation of a multi-level business.

Figure 4:
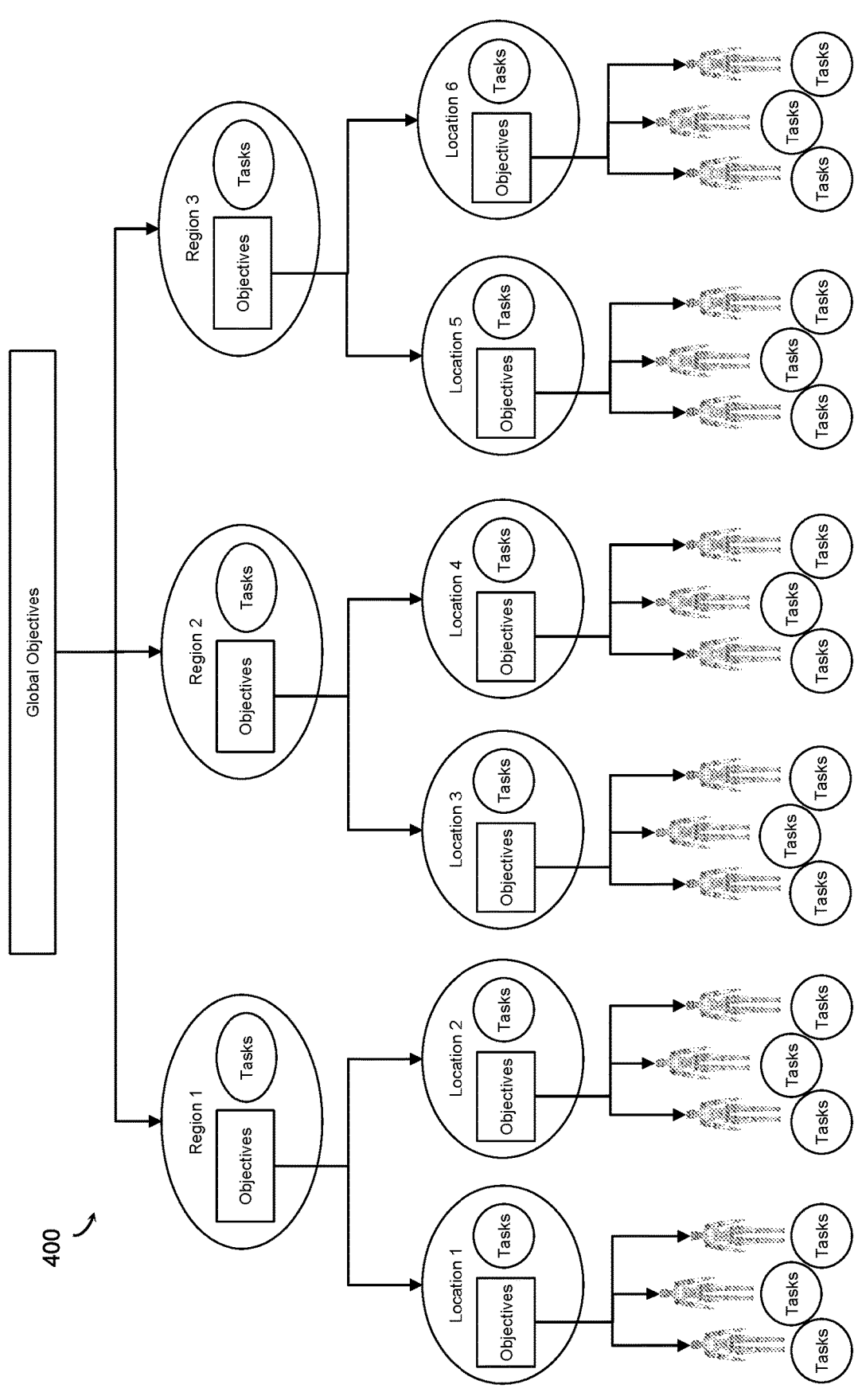
FIG. 4 is an illustrative diagram that portrays an example of hierarchical goal-setting and fulfilment using the bidirectional communication scheme depicted through FIGS. 1, 2, and 3 in accordance with the present systems, methods, and computer program products.

FIG. 4 is an illustrative diagram 400 that portrays an example of hierarchical goal-setting and fulfilment using the bidirectional communication scheme depicted through FIGS. 1, 2, and 3 in accordance with the present systems, methods, and computer program products. In FIG. 4, top-level business objectives (i.e., global objectives) are set by the global manager (e.g., 310) corresponding to the conventional corporate headquarters. The global objectives are communicated downstream to the region managers (e.g.,

210, 220, and 230). The region managers (e.g., 210, 220, and 230) may perform certain tasks (e.g., mid-level tasks) directly in furtherance of the global objectives. The region managers (e.g., 210, 220, and 230) may specify mid-level objectives that, once completed, will achieve or further the global objectives. The mid-level objectives set by the region managers (e.g., 210, 220, and 230) are communicated downstream to the location managers (e.g., 110, 120, and 130). The location managers (e.g., 110, 120, and 130) may perform certain tasks (e.g., low-level tasks) directly in furtherance of the mid-level objectives. The location managers (e.g., 110, 120, and 130) may specify low-level objectives that, once completed, will achieve or further the mid-level objectives. The low-level objectives set by the location managers (e.g., 110, 120, and 130) are communicated downstream to the robot workers (e.g., 101, 102, and 103). The robot workers (e.g., 101, 102, and 103) may perform certain tasks (e.g., "ground-level tasks") directly in furtherance of the low-level objectives.

While the hierarchical assignment of objectives generally flows downstream in FIG. 4, the status of tasks, and data collected in the process of performing tasks, may flow upstream. This data may originate at the robot workers (e.g., 101, 102, and 103) and may be used by the various location managers (e.g., 110, 120, and 130), region managers (e.g., 210, 220, and 230), and the global manager (e.g., 310) to evaluate objectives, refine objectives, and/or register objectives as complete in real-time. In this way, a top-level objective set by the global manager (e.g., 310), such as "maximize profit" may result in a ground-level task performed by a robot worker (e.g., 101), such as mop the spill in aisle 6. An illustrative objective hierarchy corresponding to this example might be:

---

Global Objective (set by Global Manager 310): Maximize Profit

→ Region Objective (set by Region Manager 210): Sell High-Margin Products that are in Demand in the Region → Location Objective (set by Location Manager 110): Ensure All Products are Readily Accessible by Customers → Task Objective (set by Robot Worker 101): Mop the Spill in Aisle 6

---

And likewise, information may flow back upstream from the robot workers (e.g., 101) to inform global tasks and/or objective setting by the global manager (310), such as:

---

Task Report (from Robot Worker 101 to Location Manager 110): 100 mL of soap used in mopping the spill in Aisle 6

→ Resource Report (from Location Manager 110 to Region Manager 210): 4.1 L of soap used by this location during time period X → Resource Report (from Region Manager 210 to Global Manager 310): 210 L of soap used by this region during time period X → Global Task (set by Global Manager 310): Renegotiate pricing from soap supplier ABC based on higher-than-expected soap consumption

---

FIG. 5 is a flow diagram showing an exemplary method 500 of hierarchical multi-agent goal-seeking (e.g., autonomous operation of a multi-level system, such as a business) in accordance with the present systems, methods, and computer program products. Method 500 includes nine acts 501, 502, 503, 504, 505, 506, 507, 508, and 509, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 501, a top-level artificial intelligence-based controller (e.g., global manager 310) specifies at least one top-level (e.g., global) business objective. For example, "Maximize Profit" as described above.

At 502, a set of mid-level artificial intelligence-based controllers (e.g., region managers 210, 220, and 230) receives the top-level business objective(s).

At 503, at least one mid-level artificial intelligence-based controller (e.g., region manager 210) in the set of mid-level artificial intelligence-based controllers completes at least one task in furtherance of at least one top-level business objective. The at least one task may include a function or operation for which the mid-level artificial intelligence-based controller (e.g., region manager 210) is responsible, such as analyzing and/or reporting on regional activity, deciding to open/close a particular location, and so on.

At 504, at least one mid-level artificial intelligence-based controller (e.g., region manager 210) in the set of mid-level artificial intelligence-based controllers specifies at least one mid-level business objective in furtherance of at least one top-level business objective. For example, "Sell High-Margin Products that are in Demand in the Region" as described above.

At 505, a set of low-level artificial intelligence-based controllers (e.g., location managers 110, 120, and 130) receives the at least one mid-level business objective.

At 506, at least one low-level artificial intelligence-based controller (e.g., location manager 110) in the set of low-level artificial intelligence-based controllers completes at least one task in furtherance of at least one mid-level business objective. For example, location manager 110 may order stock of a particularly well-selling retail item.

At 507, at least one low-level artificial intelligence-based controller (e.g., location manager 110) in the set of low-level artificial intelligence-based controllers specifies at least one low-level business objective in furtherance of at least one mid-level business objective. For example, "Ensure All Products are Readily Accessible by Customers" as described above.

At 508, a set of robots (e.g., 101, 102, and 103) receives the at least one low-level business objective.

At 509, at least one robot (e.g., 101) in the set of robots autonomously completes at least one task in furtherance of at least one low-level business objective. For example, "Mop the Spill in Aisle 6" as described above.

A person of skill in the art will appreciate that in alternative implementations, the systems, methods, and computer program products described herein may include more or fewer hierarchical levels than those used in the illustrative examples described herein. E.g., global manager→location manager with no intervening region manager, or multiple hierarchical tiers of region managers in between the global manager and the location managers.

FIG. 6 is a flow diagram showing an exemplary method 600 of operating a multi-level control system (e.g., a business) in accordance with the present systems, methods, and computer program products. Method 600 includes seven acts 601, 602, 603, 604, 605, 606, and 607, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

In some implementations, method 600 may continue from act 509 of method 500.

At 601, at least one robot system (e.g., 101, 102, and/or 103) in a set of robot systems collects data about completing at least one task in furtherance of at least one low-level objective. For example, the at least one robot system (e.g., 101) may collect data about the task completed at 509 of method 500.

At 602, a low-level artificial intelligence-based controller (e.g., 110) in a set of low-level artificial intelligence-based controllers (e.g., 110, 120, and 130) receives the data collected at 601 form the robot system (e.g., 101). The data may be transmitted through any communicative coupling, such as through a direct communicative tethered connection or through a wireless connection, or indirectly through the cloud or internet.

At 603, the low-level artificial intelligence-based controller (e.g., location manager 110) that receives the data at 602 generates at least a first report based at least in part on the data. The report may include metrics or an analysis about the task completion, such as the quality of completion, completion time, efficiency, resources consumed, and so on. In some implementations, the first report may be based at least in part on data collected by multiple robot systems (e.g., 101, 102, 103, etc.) in relation to the completion of multiple different tasks and/or multiple instances of the same or similar task.

At 604, a mid-level artificial intelligence-based controller (e.g., region manager 210) in a set of low-level artificial intelligence-based controllers (e.g., 210, 220, and 230) receives the first report from the low-level artificial intelligence controller (e.g., location manager 110) that generated the first report at 603.

At 605, the mid-level artificial intelligence-based controller (e.g., region manager 210) that receives the first report at 604 generates at least a second report based at least in part on the first report. In some implementations, the second report generated by the mid-level artificial intelligence-based controller (e.g., region manager 210) at 605 may be based at least in part on multiple "first reports" generated by multiple low-level artificial intelligence-based controllers (e.g., location managers 110, 120, 130, and so on) based at least in part on data collected by multiple robot systems (e.g., 101, 102, 103, etc.) in relation to the completion of multiple different tasks and/or multiple instances of the same or similar task. For example, the second report generated at 605 may include a summary or synthesis of a set of first reports received from the set of low-level artificial intelligence-based controllers.

At 606, the second report is received by a top-level artificial intelligence-based controller (e.g., global manager 310).

At 607, the top-level artificial intelligence controller (e.g., global manager 310) specifies at least one top-level objective based at least in part on the second report. In some implementations, the at least one top-level objective may be based at least in part on multiple second reports received from multiple mid-level artificial intelligence-based controllers (e.g., region managers 210, 220, 230, and so on). In some implementations, the top-level objective specified at 607 may be a new top-level objective or a refinement to a pre-existing top-level objective. In some implementations, an instance of method 500 may follow an instance of method 600 with the top-level objective specified at 607 of method 600 corresponding to the top-level objective specified at 501 of method 500.

In some implementations, respective artificial intelligence-based controllers that are not embodied in robot systems may be executed on/by respective discrete computer systems/servers. E.g., a first computer system may act as the global manager, a second computer system may act as a first region manager, a third computer system may act as a second region manager, a fourth computer system may act as a first location manager, and so on. However, in other implementations, a single computer system may execute (e.g., act as) multiple different artificial intelligence-based controllers. For example, a single computer system may store and execute one or more computer program product(s) that cause the single computer system to perform the functions of any combination of: the global manager, any/all region managers, and/or any/all location managers. Regardless of the specific implementation, communicative coupling exists between the various levels of artificial intelligence-based controllers. For example, the top-level artificial intelligence-based controller is controller is communicatively coupled to each mid-level artificial intelligence-base controller, each low-level artificial intelligence-based controller is communicatively coupled to at least one mid-level artificial intelligence-based controller, and each robot system is communicatively coupled to at least one low-level artificial intelligence-based controller.

For the purposes of the present systems, methods, and computer program products, a computer program product is a non-transitory processor-readable storage medium or memory storing processor-executable instructions and/or data that, when executed by at least one processor of a processor-based system, cause the processor-based system to perform various acts, functions, and/or methods as described herein.

Figure 9:
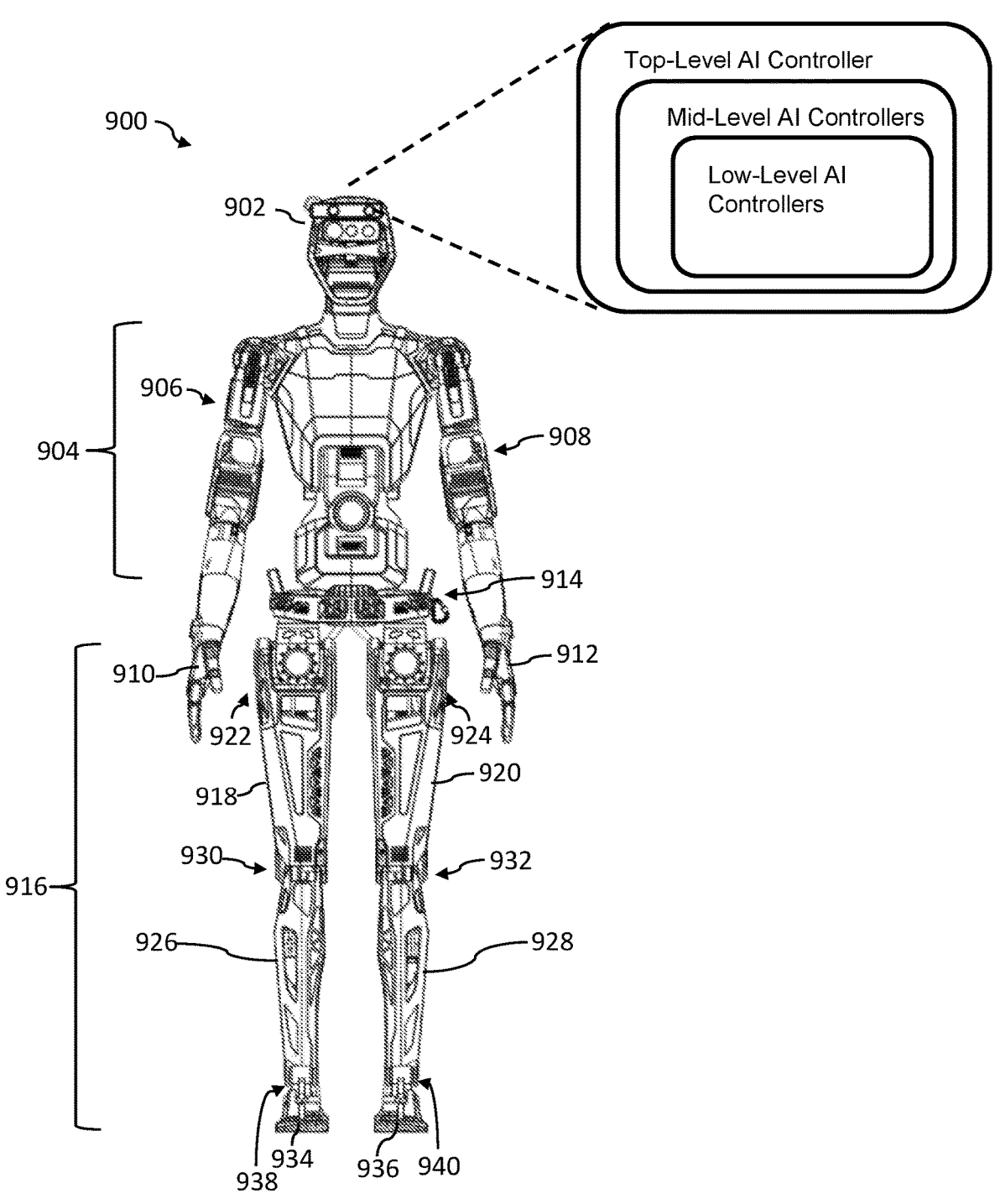
FIG. 9 is a schematic drawing of a front view of a robot system in accordance with the present systems, methods, and computer program products.

In various implementations, elements of a multi-level control system may be embodied in one or more computer program product(s). For example, the top-level artificial-intelligence-based controller may comprise a non-transitory processor-readable storage medium storing processor-executable instructions and/or data that, when executed by at least one processor, cause the at least one processor to specify top-level objectives. Similarly, each mid-level artificial intelligence-based controller in the set of mid-level artificial intelligence-based controllers may comprises respective processor-executable instructions and/or data that, when executed by at least one processor, cause the at least one processor to specify mid-level objectives in furtherance of the top-level objectives, and each low-level artificial intelligence-based controller in the set of low-level artificial intelligence-based controllers may comprise respective processor-executable instructions and/or data that, when executed by at least one processor, cause the at least one processor to specify low-level objectives in furtherance of the mid-level objectives. In some implementations, multiple levels of a multi-level control system (i.e., top-level controller, mid-level controllers, and low-level controllers) may be contained within a single computer program product; whereas in other implementations, multiple levels of a multi-level control system (i.e., top-level controller, mid-level controllers, and low-level controllers)

may be distributed across multiple computer program products. As described previously each computer program product may be stored an executed on one or more computer systems and/or robot systems depending on the specific implementation. Examples of such configurations are depicted in FIGS. 7, 8, and 9.

Figures 7, 8:
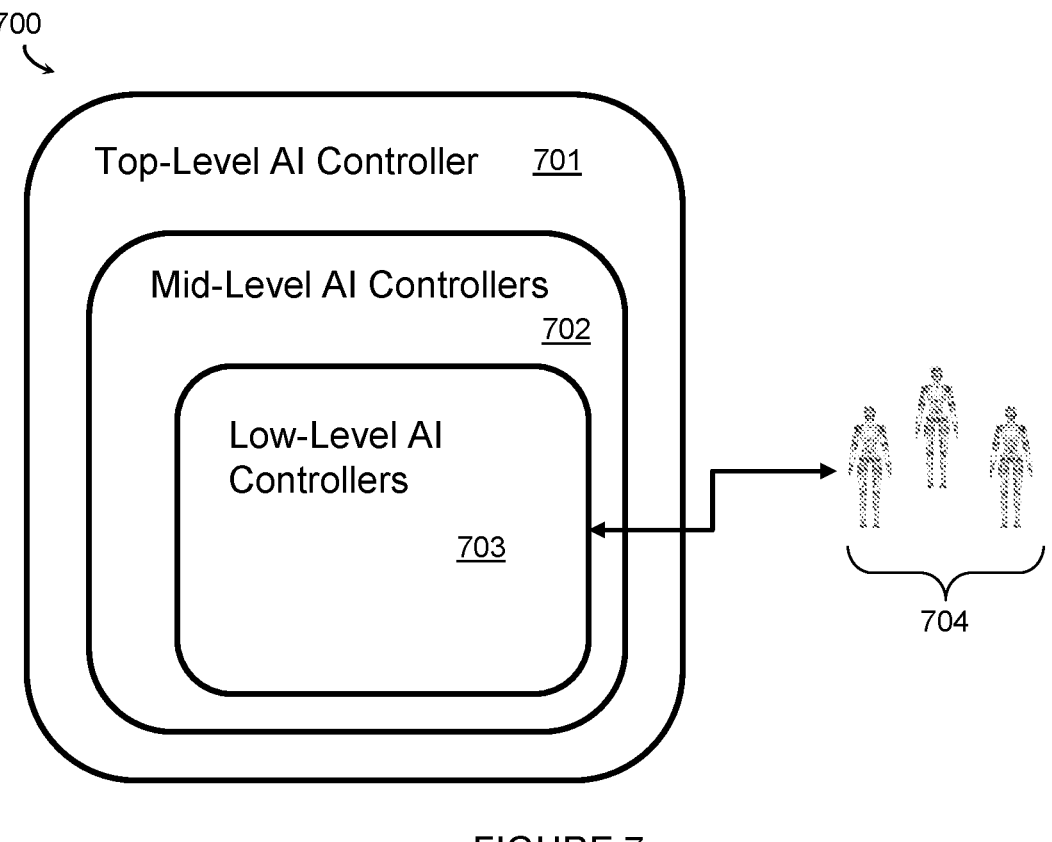
FIG. 7 is a schematic diagram showing an exemplary implementation of a multi-level control system in accordance with the present systems, methods, and computer program products.
FIG. 8 is a schematic diagram showing another exemplary implementation of a multi-level control system in accordance with the present systems, methods, and computer program products.

FIG. 7 is a schematic diagram showing an exemplary implementation of a multi-level control system 700 in accordance with the present systems, methods, and computer program products. Multi-level control system 700 includes a top-level artificial-intelligence-based controller 701 to specify top-level objectives; a set of mid-level artificial intelligence-based controllers 702 to specify mid-level objectives in furtherance of the top-level objectives; a set of low-level artificial intelligence-based controllers 703 to specify low-level objectives in furtherance of the mid-level objectives; and a set of robot systems 704 to complete tasks in furtherance of the low-level objectives. In the exemplary implementation of system 700, the top-level artificial intelligence-based controller 701, the set of mid-level artificial intelligence-based controllers 702, and the set of low-level artificial intelligence-based controllers 703 are all stored on a same non-transitory processor-readable storage medium.

FIG. 8 is a schematic diagram showing another exemplary implementation of a multi-level control system 800 in accordance with the present systems, methods, and computer program products. Multi-level control system 800 is functionally similar to multi-level control system 700 from FIG. 7, except that in multi-level control system 800 the top-level artificial intelligence-based controller 801, at least one mid-level artificial intelligence-based controller 802, and at least one low-level artificial intelligence-based controller 803 are all stored on separate respective non-transitory processor-readable storage media.

Regardless of the specific configuration of computer program product(s) in terms of storage and execution location, functionally each low-level artificial intelligence-based controller in the set of low-level artificial intelligence-based controllers at least partially controls operations of a respective set of robot systems at a respective location (e.g., a respective business location); mid-level artificial intelligence-based controller in the set of mid-level artificial intelligence-based controllers at least partially controls operations of a respective subset of low-level artificial intelligence-based controllers in the set of low-level artificial intelligence-based controllers; and the top-level artificial intelligence-based controller at least partially controls operations of each mid-level artificial intelligence-based controller in the set of mid-level artificial intelligence-based controllers.

As previously described, in some implementations any or all of the top-level AI-based controller, one or more mid-level AI-based controller(s), and/or one or more low-level AI-based controller(s) may be stored in (e.g., embodied in) a non-transitory processor-readable storage medium of a robot system and executed by a processor of the robot system. FIG. 9 is a schematic drawing of a front view of a robot system 900 (for example, robot system 101 of FIG. 1), in accordance with the present systems, methods, and computer program products.

In some implementations, robot system 900 is capable of autonomous travel (e.g., via bipedal walking).

Robot system 900 includes a head 902, a torso 904, robotic arms 906 and 908, and hands 910 and 912. Robot system 900 includes a bipedal robot, and includes a joint 914 between torso 904 and robotic legs 916. Joint 914 may allow a rotation of torso 904 with respect to robotic legs 916. For example, joint 914 may allow torso 904 to bend forward.

Robotic legs 916 include upper legs 918 and 920 with hip joints 922 and 594, respectively. Robotic legs 916 also include lower legs 926 and 928, mechanically coupled to upper legs 918 and 920 by knee joints 930 and 932, respectively. Lower legs 926 and 928 are also mechanically coupled to feet 934 and 936 by ankle joints 938 and 940, respectively. In various implementations, one or more of hip joints 922 and 924, knee joints 930 and 932, and ankle joints 938 and 940 are actuatable joints.

Robot system 900 may include a hydraulically-powered robot. In some implementations, robot system 900 has alternative or additional power systems. In some implementations, torso 904 houses a hydraulic control system, for example. In some implementations, components of the hydraulic control system may alternatively be located outside the robot body, e.g., on a wheeled unit that rolls with the robot body as it moves around, or in a fixed station to which the robot body is tethered. The hydraulic control system of robot system 900 may include a hydraulic pump, a reservoir, and/or an accumulator. Hydraulic hoses may provide hydraulic couplings between the hydraulic control system and one or more pressure valves.

In some implementations, robot system 900 may be part of a mobile robot system that includes a mobile base.

Robot system 900 may include sensors, e.g., auditory, visual, tactile, and/or olfactory sensors. Robot system 900 may include a speech generator and/or a sound generator. Robot system 900 can use the speech generator and/or the sound generator in an interaction with a human. As illustrated in the exemplary implementation of FIG. 9, robot system 900 includes a non-transitory processor-readable storage medium that stored processor-executable instructions are/or data (i.e., at least one computer program product) that, when executed by at least one processor of robot system 900, cause robot system 900 to perform at least the functions/acts associated with a top-level AI-based controller (701), at least one mid-level AI-based controller (702), and at least one low-level AI-based controller (703). In some implementations, robot system 900 may also serve as a robot system 704 to complete tasks in furtherance of the low-level objectives.

The present systems, methods, and computer program products are not limited to the exemplary implementations described herein. The application of the present systems, methods, and computer program products in the autonomous operation of multi-level businesses is a non-limiting example of collective/hierarchical multiagent goal-seeking and the present systems, methods, and computer program products may be leveraged in other applications as well, such as in multi-level optimization applications like computer networking, traffic infrastructure, and so on.

The various implementations described herein provide, among other things, business systems, methods, and computer program products that deploy hierarchical artificial intelligence-based controllers. The methods and computer program products described herein, when executed via one or more computer systems, improve the functioning and performance of such computer systems (and any associated business in furtherance of which such systems, methods, and computer program products are applied) for the specific practical purpose of optimizing operational efficiency.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, wireless signal exchange (e.g., through telecommunications networks including cellular networks and/or through WAN/LAN), and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, methods, and computer program products. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of operating a hierarchical control system, the method comprising:

specifying, by a top-level artificial-intelligence-based controller, at least one top-level objective;

receiving the at least one top-level objective by a set of mid-level artificial intelligence-based controllers;

specifying, by at least one mid-level artificial intelligence-based controller in the set of mid-level artificial intelligence-based controllers, at least one mid-level objective in furtherance of at least one top-level objective;

receiving the at least one mid-level objective by a set of low-level artificial intelligence-based controllers;

specifying, by at least one low-level artificial intelligence-based controller in the set of low-level artificial intelligence-based controllers, at least one low-level objective in furtherance of at least one mid-level objective;

receiving the at least one low-level objective by a set of robot systems; and completing, by at least one robot system in the set of robot system, at least one task in furtherance of at least one low-level objective.

2. The method of claim 1, further comprising:

completing, by at least one mid-level artificial intelligence-based controller in the set of mid-level artificial intelligence-based controllers, at least one task in furtherance of at least one top-level objective.

3. The method of claim 1, further comprising:

completing, by at least one low-level artificial intelligence-based controller in the set of low-level artificial intelligence-based controllers, at least one task in furtherance of at least one mid-level business objective.

4. The method of claim 1 wherein the hierarchical control system includes a multi-level business operation, and wherein:

specifying, by a top-level artificial-intelligence-based controller, at least one top-level objective includes specifying, by a top-level artificial-intelligence-based controller, at least one top-level business objective;

receiving the at least one top-level objective by a set of mid-level artificial intelligence-based controllers includes receiving the at least one top-level business objective by a set of mid-level artificial intelligence-based controllers;

specifying, by at least one mid-level artificial intelligence-based controller in the set of mid-level artificial intelligence-based controllers, at least one mid-level objective in furtherance of at least one top-level objective includes specifying, by at least one mid-level artificial intelligence-based controller in the set of mid-level artificial intelligence-based controllers, at least one mid-level business objective in furtherance of at least one top-level business objective;

receiving the at least one mid-level objective by a set of low-level artificial intelligence-based controllers includes receiving the at least one mid-level business objective by a set of low-level artificial intelligence-based controllers;

specifying, by at least one low-level artificial intelligence-based controller in the set of low-level artificial intelligence-based controllers, at least one low-level objective in furtherance of at least one mid-level objective includes specifying, by at least one low-level artificial intelligence-based controller in the set of low-level artificial intelligence-based controllers, at least one low-level business objective in furtherance of at least one mid-level business objective;

receiving the at least one low-level objective by a set of robot systems includes receiving the at least one low-level business objective by a set of robot systems;

completing, by at least one robot system in the set of robot system, at least one task in furtherance of at least one low-level objective includes completing, by at least one robot system in the set of robot system, at least one task in furtherance of at least one low-level business objective.

5. The method of claim 4 wherein each low-level artificial intelligence-based controller in the set of low-level artificial intelligence-based controllers at least partially controls operations at a respective business location of the multi-level business operation.

6. The method of claim 5 wherein each mid-level artificial intelligence-based controller in the set of mid-level artificial intelligence-based controllers at least partially controls operations over a respective business region of the multi-level business operation, each respective business region consisting of a respective set of business locations.

7. The method of claim 5 wherein the top-level artificial-intelligence-based controller at least partially controls operations of all business regions in the multi-level business operation.

8. The method of claim 1, further comprising:

collecting, by at least one robot system in the set of robot systems, data about completing the at least one task in furtherance of at least one low-level objective;

receiving, by a low-level artificial intelligence-based controller in the set of low-level artificial intelligence-based controllers, the data;

generating, by the low-level artificial intelligence-based controller in the set of low-level artificial intelligence-based controllers, at least a first report based at least in part on the data;

receiving, by a mid-level artificial intelligence-based controller in the set of low-level artificial intelligence-based controllers, the first report;

generating, by the mid-level artificial intelligence-based controller in the set of mid-level artificial intelligence-based controllers, at least a second report based at least in part on the first report;

receiving, by the top-level artificial intelligence-based controller, the second report; and specifying, by the top-level artificial intelligence controller, at least one top-level objective based at least in part on the second report.

9. A multi-level control system comprising:

a top-level artificial-intelligence-based controller comprising a non-transitory processor-readable storage medium storing processor-executable instructions and/ or data that, when executed by at least one processor, cause the at least one processor to specify top-level objectives;

a set of mid-level artificial intelligence-based controllers each comprising respective processor-executable instructions and/or data that, when executed by at least one processor, cause the at least one processor to specify mid-level objectives in furtherance of the top-level objectives;

a set of low-level artificial intelligence-based controllers each comprising respective processor-executable instructions and/or data that, when executed by at least one processor, cause the at least one processor to specify low-level objectives in furtherance of the mid-level objectives; and a set of robot systems to complete tasks in furtherance of the low-level objectives.

10. The multi-level control system of claim 9 wherein at least one low-level artificial intelligence-based controller is embodied in a robot system in the set of robot systems.

11. The multi-level control system of claim 9 wherein at least one mid-level artificial intelligence-based controller is embodied in a robot system in the set of robot systems.

12. The multi-level control system of claim 9 wherein the top-level artificial intelligence-based controller is embodied in a robot system in the set of robot systems.

13. The multi-level control system of claim 9 wherein each of the top-level artificial intelligence-based controller, the set of mid-level artificial intelligence-based controllers, the set of low-level artificial intelligence-based controllers, and the set of robot systems all operate substantially without human intervention.

14. The multi-level control system of claim 9 wherein each low-level artificial intelligence-based controller in the set of low-level artificial intelligence-based controllers at least partially controls operations of a respective set of robot systems at a respective business location.

15. The multi-level control system of claim 14 wherein each mid-level artificial intelligence-based controller in the set of mid-level artificial intelligence-based controllers at least partially controls operations of a respective subset of low-level artificial intelligence-based controllers in the set of low-level artificial intelligence-based controllers.

16. The multi-level control system of claim 15 wherein the top-level artificial intelligence-based controller at least partially controls operations of each mid-level artificial intelligence-based controller in the set of mid-level artificial intelligence-based controllers.

17. The multi-level control system of claim 9 wherein the top-level artificial intelligence-based controller, the set of mid-level artificial intelligence-based controllers, and the set of low-level artificial intelligence-based controllers are all stored on a same non-transitory processor-readable storage medium.

18. The multi-level control system of claim 9 wherein at least two of the top-level artificial intelligence-based controller, a mid-level artificial intelligence-based controller in the set of mid-level artificial intelligence-based controllers, and a low-level artificial intelligence-based controller in the set of low-level artificial intelligence-based controllers are stored on separate respective non-transitory processor-readable storage media.

* * * * *